(12) United States Patent
von Wendorff

(10) Patent No.: US 8,843,777 B2
(45) Date of Patent: Sep. 23, 2014

(54) MODIFYING PERIODIC SIGNALS PRODUCED BY MICROCONTROLLER

(75) Inventor: Wilhard von Wendorff, Munich (DE)

(73) Assignee: Infineon Technologies AG (DE)

( * ) Notice: Subject to any disclaimer, the term of this patent is extended or adjusted under 35 U.S.C. 154(b) by 1418 days.

(21) Appl. No.: 12/033,990

(22) Filed: Feb. 20, 2008

(65) Prior Publication Data

US 2009/0210602 A1    Aug. 20, 2009

(51) Int. Cl.
| | | |
|---|---|---|
| G06F 1/04 | (2006.01) | |
| G06F 1/12 | (2006.01) | |
| G06F 13/37 | (2006.01) | |
| G06F 15/78 | (2006.01) | |

(52) U.S. Cl.
CPC .................................. *G06F 15/7853* (2013.01)
USPC ......................................... 713/601; 710/122

(58) Field of Classification Search
CPC .. G06F 13/1684; G06F 13/37; G06F 15/7853
USPC .................... 713/600, 601; 710/305
See application file for complete search history.

(56) References Cited

U.S. PATENT DOCUMENTS

| | | | |
|---|---|---|---|
| 5,365,183 A | | 11/1994 | Mitsuhira |
| 5,414,365 A | * | 5/1995 | Coggins et al. ............... 324/607 |
| 6,128,318 A | * | 10/2000 | Sato .............................. 370/503 |
| 6,633,989 B1 | * | 10/2003 | Hollins ......................... 713/400 |
| 6,839,654 B2 | | 1/2005 | Roellig et al. |
| 7,284,142 B2 | | 10/2007 | Noha et al. |
| 2003/0074511 A1 | * | 4/2003 | Kramer et al. ................ 710/305 |
| 2004/0128474 A1 | * | 7/2004 | Vorbach ......................... 712/10 |
| 2006/0172783 A1 | * | 8/2006 | Leung et al. ................... 455/572 |
| 2006/0218427 A1 | * | 9/2006 | Fuehrer et al. ............... 713/400 |
| 2008/0063006 A1 | * | 3/2008 | Nichols ......................... 370/451 |
| 2009/0138746 A1 | * | 5/2009 | Klemer ......................... 713/502 |
| 2009/0154638 A1 | * | 6/2009 | Rogers et al. .................. 377/51 |

FOREIGN PATENT DOCUMENTS

| | | |
|---|---|---|
| DE | 10229129 C1 | 12/2003 |
| DE | 10336585 A1 | 3/2005 |
| EP | 0535615 B1 | 4/2004 |

* cited by examiner

*Primary Examiner* — Kim Huynh
*Assistant Examiner* — Brandon Kinsey
(74) *Attorney, Agent, or Firm* — Schwegman Lundberg & Woessner, P.A.

(57) ABSTRACT

Multiple modules are connected to a signal output module via first and second busses. Different commands may be transmitted on the two busses. Both busses may be hierarchically constructed so that all units are connected one after the other in a chain like manner on the busses. The modules cooperate to transition an output signal between different duty cycles and activate and deactivate responsive to timer comparisons.

5 Claims, 3 Drawing Sheets

MODIFYING PERIODIC SIGNALS PRODUCED BY MICROCONTROLLER

BACKGROUND

The use of electronic circuits such as microcontrollers to produce periodic signals (for example pulse-width modulated signals, ignition pulses, etc.) is of increasing importance. In general the signal characteristics may be changed during operation of the circuits. In prior devices, an internal timer is used to establish the time of an action. To this end, a value is stored in a comparison register that is compared with the internal timer. If a new value is now programmed into the comparison register, this new value can lie in the past from the point of view of the timer, but the overwritten value still exists in the future. When this happens, the write operation during the current period does not execute an action. The result is in an entirely disrupted signal (the signal has a "1" signal or "0" signal over a period).

Some prior devices allow changes of the contents of the comparison register only at specific time points which are not complicated for the signal. In general, the time points occur directly after an action. To this end, the unit that changes the contents of the comparison register must either wait for the right time point in a wait loop, or an interrupt (i.e. a program interruption request) activates this unit, which then updates the contents of the comparison register in an interrupt handling routine. If there is only a short time window between the old action and the new action, the program could be delayed by the interrupt's latency period or by the limited performance of the unit such that the new value occurs only after the targeted time period. When that happens, the result is a false signal (a period 0% or 100% signal). Moreover, wait loops and interrupt handling result in significant losses of performance for the unit that updates the comparison data. Furthermore, the generation of a new signal is significantly delayed in some circumstances.

A complex set of instructions may be used to alleviate the above disadvantages. However, it is not possible to completely avoid all cases since non-deterministic behavior (bus allocation, other interrupts, etc.) make timely processing much more difficult. In yet a further prior device, a stacking memory (FIFO) is used. The comparison register is used multiple times. After a successful comparison action, the contents of the register last written to are transferred to the comparison register. Thus, in all cases only the previous and the current signal are generated. This method has a disadvantage that the generation of a new signal is delayed in some cases since first an old event must take place. This can in some cases result in a complete malfunction if the old value corresponds to a deactivation (for example to produce a pulse width modulation of 0% or 100%). Another disadvantage is the hardware expense and inflexibility of use of the hardware, since the multiple implementation of the comparison register can only be used for the controlled change between two signals and can not be freely allocated by other timer channels.

A still further prior device uses identical modules to produce temporal signals. Many of these modules can produce a signal together. To do so, these modules are connected to a signal output module via a bus. Various commands can now be transmitted on this bus, for example signal transition from "0" to "1", from "1" to "0", changing the state dependent on the current state or suppression of a signal from another unit. This bus is constructed hierarchically (sequentially) so that all units are connected one after the other on the bus. The superior command (i.e. further forward in the chain) is overwritten by an inferior command that is issued at the same time. An additional line now permits a series of modules to together deactivate and activate at a period limit. Thus, a portion of the cells can be configured such that they are used to configure the new data. After updating all of these registers, the change to the next period limit is activated. This method has the disadvantage that the generation of a new signal may be significantly delayed, since first an old event must take place. Moreover, all updates must be done simultaneously since after writing new register contents and activation of the change at the next period limit for another update, for example of another set of registers, one has to wait for the period limit or temporarily deactivate the update risking to miss the next period limit and in case of periodical deactivating missing all updates.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The use of electronic circuits such as microcontrollers to produce periodic signals (for example pulse-width modulated signals, ignition pulses, etc.) is of increasing importance. There is a need to change the modulation of these signals in real time. At the moment of the change, the signals generated may temporally (e.g. duty cycle, period) be the new and the old signal or lie between the new and the old signal. A shift to the new signal should take place as early as possible (low latency).

Figure 1:
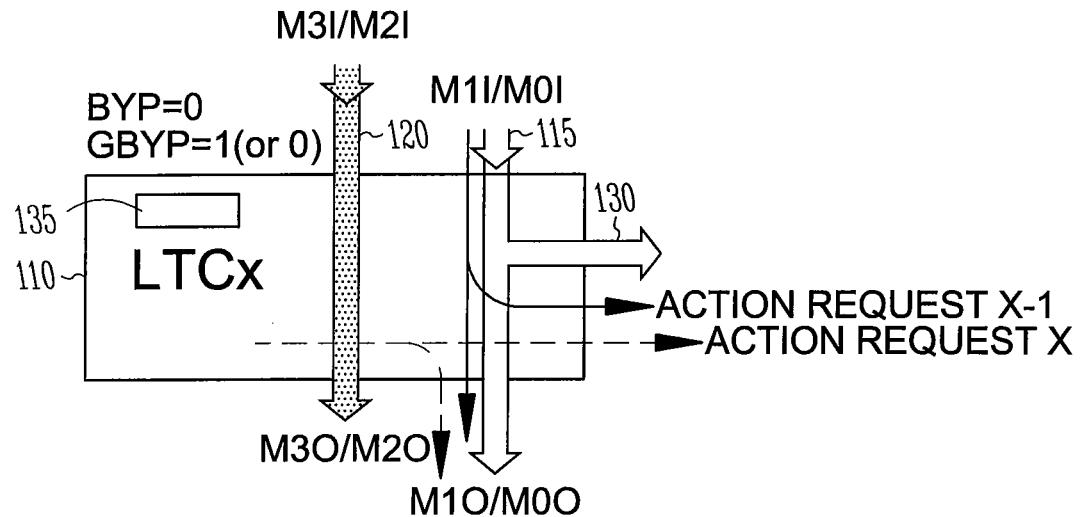
FIG. 1 is a block diagram of a timer module coupled to two busses according to an example embodiment.
Figure 2:
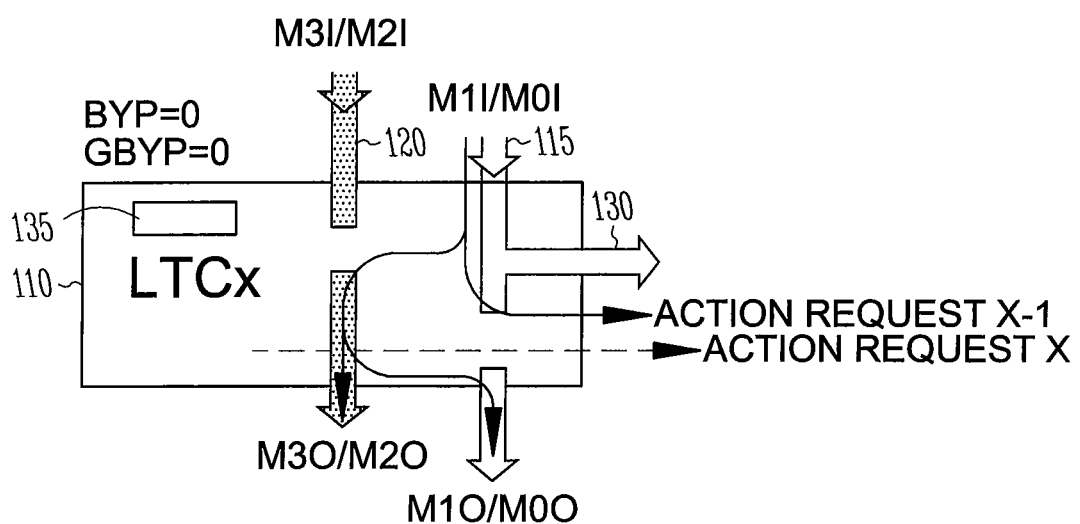
FIG. 2 is a block diagram of a timer module coupled to two busses illustrating an alternate data flow according to an example embodiment.
Figure 3:
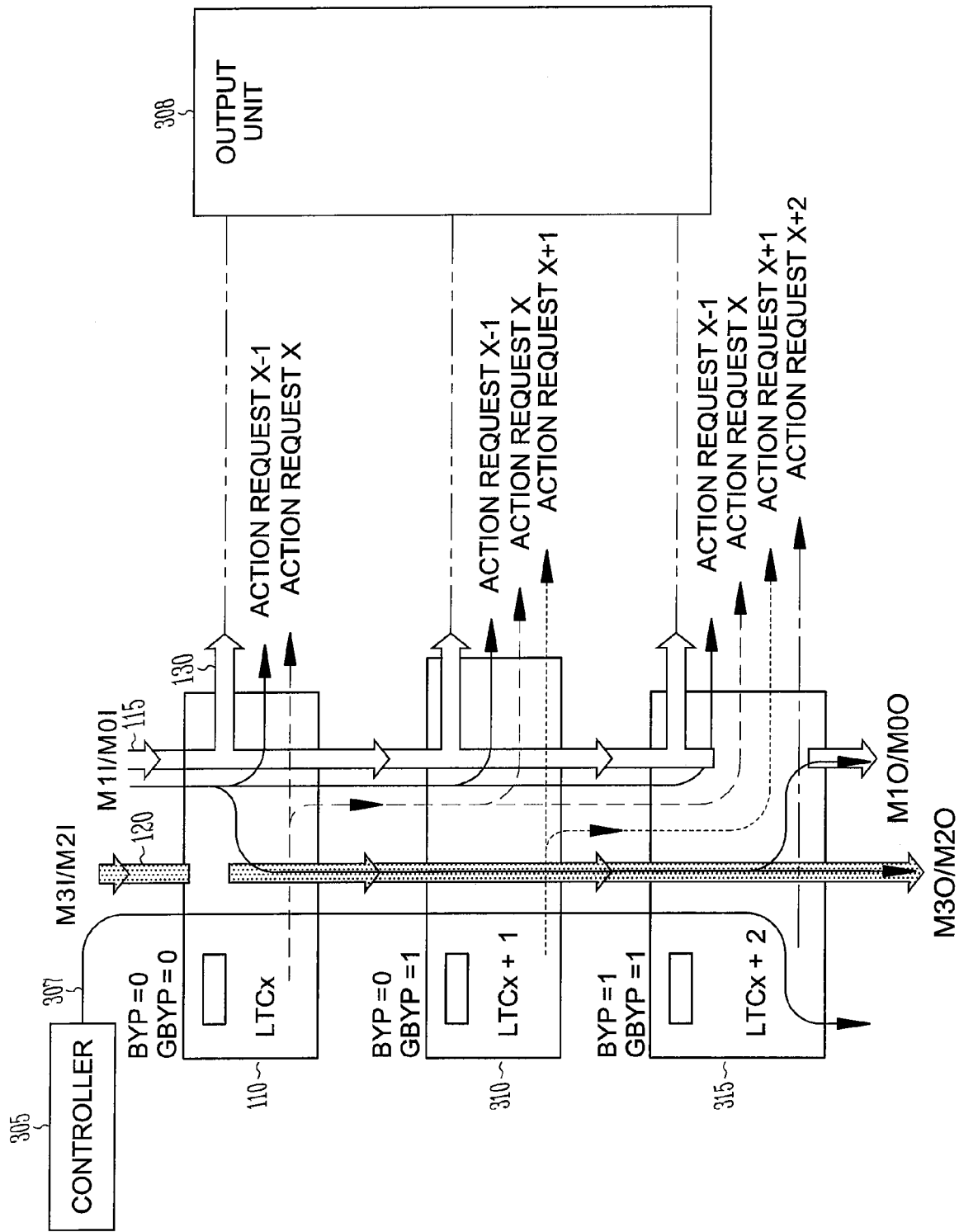
FIG. 3 is a block diagram of a dual bus chain of timer modules according to an example embodiment.
Figure 4:
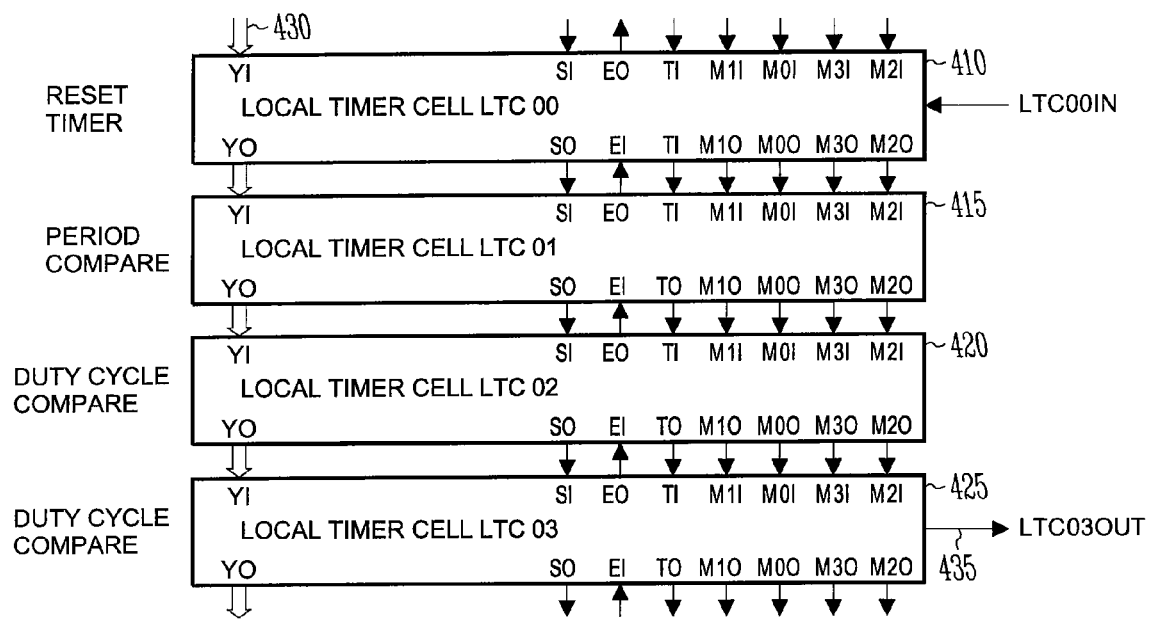
FIG. 4 is a block diagram of a dual bus chain of timer modules performing varying functions according to an example embodiment.

Various embodiments of the invention relate to use of multiple modules 110 connected to a signal output module via first and second busses 115 and 120 in FIG. 1. Using the two bus connection, different commands may be transmitted on the two busses 115 and 120. For example, signal transitions from "0" to "1", from "1" to "0", changing the state depending on the current state and suppressing a signal from another unit as illustrated in FIG. 2, where a local event is not forwarded to other units, but is sent to a next output unit at 130. Both busses may be hierarchically (sequentially) constructed so that all units are connected one after the other in a chain like manner on the (daisy chain) bus as illustrated in FIGS. 3 and 4. In one embodiment, a module 110 may be a local timer cell (LTC) having a timer state transmitted to it via one of the busses.

In one embodiment, module 110 is a local timer cell and includes a storage element such as a register 135 for storing a value. The value may be a count corresponding to a desired time interval. The local timer cell has connections for sending and receiving signals on a first and a second bus, and a comparator that compares a timer count to the stored value. A logic element in the local timer cell may allow bypassing one of the busses. Such bypassing may be a module configurable parameter in one embodiment, such that their commands are not visible to following modules. The local timer cell may also have logic allowing it to deactivate, and then reactivate on the occurrence of an event.

Various commands may be transmitted on a bus between the modules. A superior command (i.e. the one further forward in the chain) entering a module is overwritten by an inferior command issued within the module within the same time period. Every module 110 has a configurable property of switching from the first bus 115 to the second bus 120 or switching from the second bus 120 to the first bus 115. Thus, a series of modules 110, 310, 315 can be bypassed using the second bus 120 so that their commands are not visible for the following modules as illustrated in FIG. 3. This allows a command used on the bus by all modules (for example a signal change from "0" to "1", which is typical for transition-synchronized also called edge aligned pulse-width modulated signals), to be sent unchanged to multiple groups of modules, which then produce other respective local transitions for a local signal production module.

These local modules can now be used to enable an update of the temporal signal. To accomplish this, one or more deactivated modules are configured with a new signal and activated (in general at different points of time). These modules with the old signals are reconfigured so that they deactivate themselves at their next actions. Thus, two or more modules are activated simultaneously for this method for a period. The temporally earliest module determines the signal change (e.g. change from "1" to "0"). The temporally later modules no longer change the external signal since they give the same command and thus try to trigger an action that had already been executed by the temporally earlier module.

Various embodiments of the invention allow for full configurability of the hardware. Thus, either a module can be used to enable a flawless change of a signal or to produce other signal transitions or other signals, e.g. when using software to produce flawless changes in signals, such as for temporally very slow signals (periods). Furthermore, some embodiments allow switches in many cases immediately to the new signal. Only in those cases in which the old signal had already executed a signal change will a delay of one period occur in the change to the new signal. This penalty may be further reduced by software intervention by disabling old signal modules after setting up the new signal module, if the old action lies within the period before the new action.

Additionally, some embodiments provide a clean, undisrupted signal for each signal change without affecting the performance of the processor unit due to the processor unit having to use wait loops or interrupts. A further favorable characteristic of some embodiments is that signal transitions can be changed sequentially, i.e. not necessarily together. Each local group can be re-updated autonomously. It is only for the exact same signal that a change is limited by the number of modules to be activated in parallel within a period (one update per period or more).

In one embodiment, a connection to a next local output unit is done locally via an "action request" signal at 130. Every cell is capable of influencing the busses in the following ways:

1.) A locally produced command can be placed on first bus 115 and sent to the next output unit via 130.

2.) A local event can be placed on first bus 115, sent to the next output unit via 130 and forwarded to other modules connected to first bus 115 as shown in FIG. 1. FIG. 2 illustrates the opposite case in which a local event is not forwarded to other modules, but may only be sent to the next local output unit at 130.

3) The input signal of non local events of other modules received on first bus 115 can be sent to the next output unit at 130.

4.) The input signal of non local events of other modules received on first bus 115 can be forwarded to other modules connected to the first bus 115 as illustrated in FIG. 1 and in FIG. 3—modules 310 and 315.

5.) The input signal of non local events of other modules received on second bus 120 can be forwarded to other modules connected to the second bus 120 as shown in FIG. 1 and FIG. 3—modules 310 and 315.

6.) The input signal of non local events of other modules received on first bus 115 can be forwarded to other modules connected to the second bus 120 as shown in FIG. 2 and FIG. 3.

7.) The input signal of non local events of other modules received on second bus 120 can be forwarded to other modules connected to the first bus 115 as illustrated in FIG. 3 at module 315.

FIG. 3 shows the configuration of a local group within which a signal can be updated. A controller 305, such as a microcontroller, is coupled to a third bus 307. The controller provides configuration data commands to modules on the third bus 307 in order to product a desired output signal from an output unit 308. In one embodiment, the desired output signal is a pulse modulated drive signal having a desired duty cycle. The controller 305 provides commands to change the duty cycle and ensure that during the transition between different duty cycles, the output signal has a duty cycle that does not go outside the range between the old and new desired duty cycle.

The first module 110 located on first bus 115 is configured such that the commands on first bus 115 is forwarded to the output unit 308. To change the output signal, two modules 310, 315 located one after the other on first bus 115 and second bus 120 are used. A new value is transmitted to the inactive module and the module is activated. The previously active module is reconfigured such that the next action deactivates it.

Furthermore, the previously active module can also be deactivated when the action desired to trigger has already taken place in the current period or is timely ahead of the new signal. Thus, both modules may be active simultaneously for a period and produce the same command for the output unit. In the process, the temporally earlier command determines the behavior of the output unit 308. Since the module that contains the old value was deactivated in the next action or via software, in the next period the only active cell is the cell that produces the new signal. Other modules may follow to update even this new signal by an even newer signal within the same period. For each of these newer signals, the mechanism described can be used to update the older signals. Of course, other modules can follow that to produce other signal transitions. For each of these other elements, the mechanism described can be used to update the signal.

Some embodiments of the invention can also be described by considering an example: Production of a transition-synchronized (edge aligned) pulse width modulated signal. For this example, as shown in FIG. 4, four modules, reset timer module 410, period compare module 415, duty cycle compare module 420 and duty cycle compare module 425 are used. Modules 410 is also referred to as LTC00, module 415 as LTC01, module 420 as LTC02 and module 425 as LTC03. Module 410, LTC00 is configured as a timer. This represents the time basis for all events. The timer state is transmitted via bus Y 430 to modules 415, 420 and 425. When a value that is stored in module 415 (LTC01) is reached, LTC01 resets the timer in module 410 (LTC00) to an initial value e.g. "0" and LTC00 starts to count from the beginning (period limit). Furthermore LTC01 may produce a command on the first bus.

For example, in one embodiment, the period may be configured with $1000_D(=3E8_H)$. Further, module 415, LTC01 produces a transition change command on the first bus, e.g. from "1" to "0", at the output unit 435, LTC03OUT connected to module 425, LTC03. Module 420, LTC02 is configured such that it produces a transition change command, e.g. from "0" to "1", at the output unit 435 connected to LTC03 (LTC03OUT) when the timer value stored in module 420 is reached. For a 20% pulse width modulated signal in this example, the value $200_D(=C8_H)$ may be stored. If the signal is now to be changed from the currently produced 20% to 75% pulse modulation, for example, the value $600_D(=258_H)$ is stored in module 425, LTC03.

Next, module 425, LTC03 is activated. Module 420, LTC02 is configured such that the next local action deactivates module 420, LTC02. The value stored in module 420, LTC02 $(200_D=C8_H)$ is now compared to the timer value in module 410, LTC00. If the current timer value is larger than the value stored in module 420, LTC02 $(200_D=C8_H)$, LTC02 is immediately deactivated by the host (e.g. by software). Also if the value of LTC03 $(600_D=258_H)$ is larger than the value of LTC02 $(200_D=C8_H)$ LTC02 is immediately deactivated by the host (e.g. by software).

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A system comprising:
   first and second busses;
   a plurality of modules hierarchically, and sequentially, interconnected with the first and second busses in a dual bus chain, each module having first and second bus input terminals and first and second bus output terminals, the modules connected with the output terminals of modules to the beginning of the chain connected to the input terminals of a next module further along in the chain, each of the modules also including circuits to generate a command determined by an operation carried out by the module to one of the module bus output terminals, each of the modules also configured to utilize a superior command further forward in a chain to be overwritten by an inferior command issued at the same time to selectively switch the input received from the first bus input to the second bus output or the second bus input to the first bus output to bypass selected modules further forward in the chain so that their commands are not visible for following modules, each module having a local output; and
   a signal output module connected to a selected bus to produce an updated temporal signal.

2. The system of claim 1 wherein the updated temporal signal comprises an edge aligned pulse width modulated signal having a desired duty cycle.

3. The system of claim 2 wherein the duty cycle of the signal remains between an old and a new desired duty cycle during a transition from the old to the new duty cycle.

4. The system of claim 1 wherein the modules comprise a reset timer, a period compare module, and two duty cycle compare modules.

5. The system of claim 1 wherein the modules may be selected, deactivated, and reactivated.

* * * * *